(12) United States Patent
Rodriguez et al.

(10) Patent No.: US 11,370,058 B2
(45) Date of Patent: Jun. 28, 2022

(54) LOADING FEEDSTOCK INTO AN ADDITIVE FRICTION STIR DEPOSITION MACHINE

(71) Applicant: The Boeing Company, Chicago, IL (US)

(72) Inventors: Rogie I. Rodriguez, Huntsville, AL (US); Bruno Zamorano Senderos, Huntsville, AL (US)

(73) Assignee: THE BOEING COMPANY, Chicago, IL (US)

( * ) Notice: Subject to any disclaimer, the term of this patent is extended or adjusted under 35 U.S.C. 154(b) by 169 days.

(21) Appl. No.: 16/539,760

(22) Filed: Aug. 13, 2019

(65) Prior Publication Data

US 2021/0046579 A1 Feb. 18, 2021

(51) Int. Cl.
| | |
|---|---|
| *B23K 20/26* | (2006.01) |
| *B33Y 30/00* | (2015.01) |
| *B33Y 40/00* | (2020.01) |
| *B23K 20/12* | (2006.01) |

(52) U.S. Cl.
CPC ............ *B23K 20/26* (2013.01); *B23K 20/122* (2013.01); *B33Y 30/00* (2014.12); *B33Y 40/00* (2014.12)

(58) Field of Classification Search
None
See application file for complete search history.

(56) References Cited

U.S. PATENT DOCUMENTS

| | | | | |
|---|---|---|---|---|
| 7,455,212 | B2 * | 11/2008 | Mika | B23K 20/1245 228/2.1 |
| 8,875,976 | B2 * | 11/2014 | Schultz | B23K 20/128 228/2.1 |
| 9,511,445 | B2 * | 12/2016 | Kandasamy | B23K 20/2333 |
| 9,511,446 | B2 * | 12/2016 | Kandasamy | B23K 20/1295 |
| 10,987,754 | B1 * | 4/2021 | Eller | B23K 20/122 |
| 2012/0009339 | A1 | 1/2012 | Creehan et al. | |
| 2012/0279441 | A1 | 11/2012 | Creehan et al. | |
| 2017/0120513 | A1 * | 5/2017 | Brennan | B28B 1/001 |
| 2018/0085849 | A1 | 3/2018 | Kandasamy et al. | |
| 2018/0311899 | A1 * | 11/2018 | Titchener | B22F 10/10 |
| 2018/0361501 | A1 * | 12/2018 | Hardwick | B23K 20/227 |
| 2019/0366473 | A1 * | 12/2019 | Dong | B22F 12/00 |
| 2020/0189025 | A1 * | 6/2020 | Rodriguez | B23K 20/128 |
| 2020/0238609 | A1 * | 7/2020 | Stranberg | B29C 64/118 |
| 2020/0306869 | A1 * | 10/2020 | Hardwick | B23K 20/128 |
| 2020/0307069 | A1 * | 10/2020 | Fastert | B29C 64/321 |
| 2020/0331203 | A1 * | 10/2020 | Verma | B23K 20/1225 |

FOREIGN PATENT DOCUMENTS

| | | | | |
|---|---|---|---|---|
| WO | 2019089764 A1 | 5/2019 | | |
| WO | WO-2019178138 A2 * | 9/2019 | ............ | B33Y 70/00 |

OTHER PUBLICATIONS

The Intellectual Property Office of the United Kingdom, Search Report Issued in Application No. GB2010397.4, dated Dec. 17, 2020, 1 page.

* cited by examiner

*Primary Examiner* — Devang R Patel
(74) *Attorney, Agent, or Firm* — Alleman Hall Creasman & Tuttle LLP (57) ABSTRACT

A method for loading feedstock bars into an additive friction stir deposition machine (AFSD) is described. The method comprises containing a plurality of feedstock bars in a container disposed adjacent to a spindle of the additive friction stir deposition machine. The method further comprises moving one feedstock bar of the plurality of feedstock bars into axial alignment with the spindle of the additive friction stir deposition machine.

20 Claims, 12 Drawing Sheets

LOADING FEEDSTOCK INTO AN ADDITIVE FRICTION STIR DEPOSITION MACHINE

FIELD

The invention relates to additive manufacturing, and more particularly to an additive friction stir deposition (AFSD) machine.

BACKGROUND

In additive manufacturing, material is typically deposited layer-by-layer to form three-dimensional parts. Additive manufacturing has gained popularity due to its ability to form parts with complex geometries using a variety of materials, including ceramics, glass, thermoplastics, and metal powders.

Additive manufacturing encompasses different techniques that deposit material in different ways. Directed energy deposition and material extrusion additive manufacturing, for example, involve the deposition of melted material. Other techniques sinter a powdered material to build layers, as with some types of powder bed fusion. Yet other additive manufacturing techniques are solid-state. One such technique is referred to as additive friction stir deposition (AFSD). In AFSD, an additive material is deposited onto a substrate or previously formed layers via frictional forces that stir and deform the material without heating the material to its melting point. As such, AFSD can enable the manufacture of parts with desired material properties at low levels of heat without sintering and other post-processes. AFSD can also support the formation of widely scalable part sizes and geometries, repair and coating processes, as well as manufacture, use of diverse materials, and operation in open-air environments.

In some implementations of AFSD, a spindle receives an additive material and is rotated to impart frictional forces to the material at the material/substrate interface to thereby stir, soften, and deposit the material. In some examples the additive material takes the form of solid, discrete feedstock bars that are fed one-by-one into the spindle. Loading the spindle in this manner poses various challenges that adversely affect an AFSD manufacturing process, however. For example, when another feedstock bar is to be loaded, the rotating spindle must be stopped prior to reloading. As a result, part formation is interrupted. Further, in some examples the spindle also must be moved to an intermediate location to reload feedstock, and then moved back into position relative to the part before resuming deposition. These process interruptions reduce the overall average deposition rate and require operator interventions to reload feedstock.

Another outcome of such interruptions is that deposited feedstock undergo a cooling period during the interruptions, which may reduce the quality of parts formed by such feedstock and constrain potential part geometries. Further, in some examples of loading feedstock bars one-by-one, the deposition process must be halted before the entire feedstock bar is utilized. In these examples, a terminal portion of each feedstock bar fed into the spindle is not be deposited, creating waste. Thus, and in view of the above, challenges exist in AFSD manufacturing processes using feedstock bars, such as increasing deposition speed and improving quality of deposited material.

SUMMARY

To address the above issues, according to one aspect of the present disclosure, a method for loading feedstock bars into an additive friction stir deposition (AFSD) machine is provided. In this aspect, the method comprises containing a plurality of feedstock bars in a container disposed adjacent to a spindle of the additive friction stir deposition machine. The method further comprises moving one feedstock bar of the plurality of feedstock bars into axial alignment with the spindle of the additive friction stir deposition machine.

Another aspect of the present disclosure relates to a container for loading feedstock bars into an additive friction stir deposition machine. In this aspect, the container comprises a staging mechanism configured to move one feedstock bar of a plurality of feedstock bars held within the container into axial alignment with a spindle of the additive friction stir deposition machine.

Another aspect of the present disclosure relates to a system for loading feedstock bars into an additive friction stir deposition machine. In this aspect, the system comprises a container configured to hold a plurality of feedstock bars. In this aspect, the system further comprises a staging mechanism configured to move one feedstock bar of the plurality of feedstock bars into axial alignment with a spindle of the additive friction stir deposition machine. In this aspect, the system further comprises a loading actuator configured to insert the one feedstock bar into the spindle of the additive friction stir deposition machine.

The features, functions, and advantages that have been discussed can be achieved independently in various embodiments or can be combined in yet other embodiments, further details of which can be seen with reference to the following description and drawings.

DETAILED DESCRIPTION

In view of the considerations discussed above, systems, methods, and apparatuses are provided that relate to loading feedstock bars for deposition in additive friction stir deposition (AFSD) manufacturing. Briefly, multiple feedstock bars are held in a container of an AFSD machine, with one feedstock bar being moved from a staging position into axial alignment with a spindle of the AFSD machine via a staging mechanism. The multiple feedstock bars are held in the container via different structures and/or mechanisms, such as a helicoid spring, chain, and gear assembly. The staging mechanism can assume different forms, including that of an actuator (e.g., motor), staging spring, and lever.

Using a container to hold and stage multiple feedstock bars enables individual bars to be fed into the spindle and deposited substantially continuously. In this manner, such a container enables the AFSD machine to be operated with increased average deposition rates and reduced or zero operator involvement. Example implementations described herein also allow staging and loading of feedstock bars without stopping spindle rotation. The substantially continuous deposition of feedstock also reduce cooling periods that arise from interrupting deposition, allowing for higher quality parts and more complex geometries. Further, the entirety of each feedstock bar can be deposited, thereby reducing waste. As a result, parts can be formed at higher yields and reduced cost.

Figure 1A:
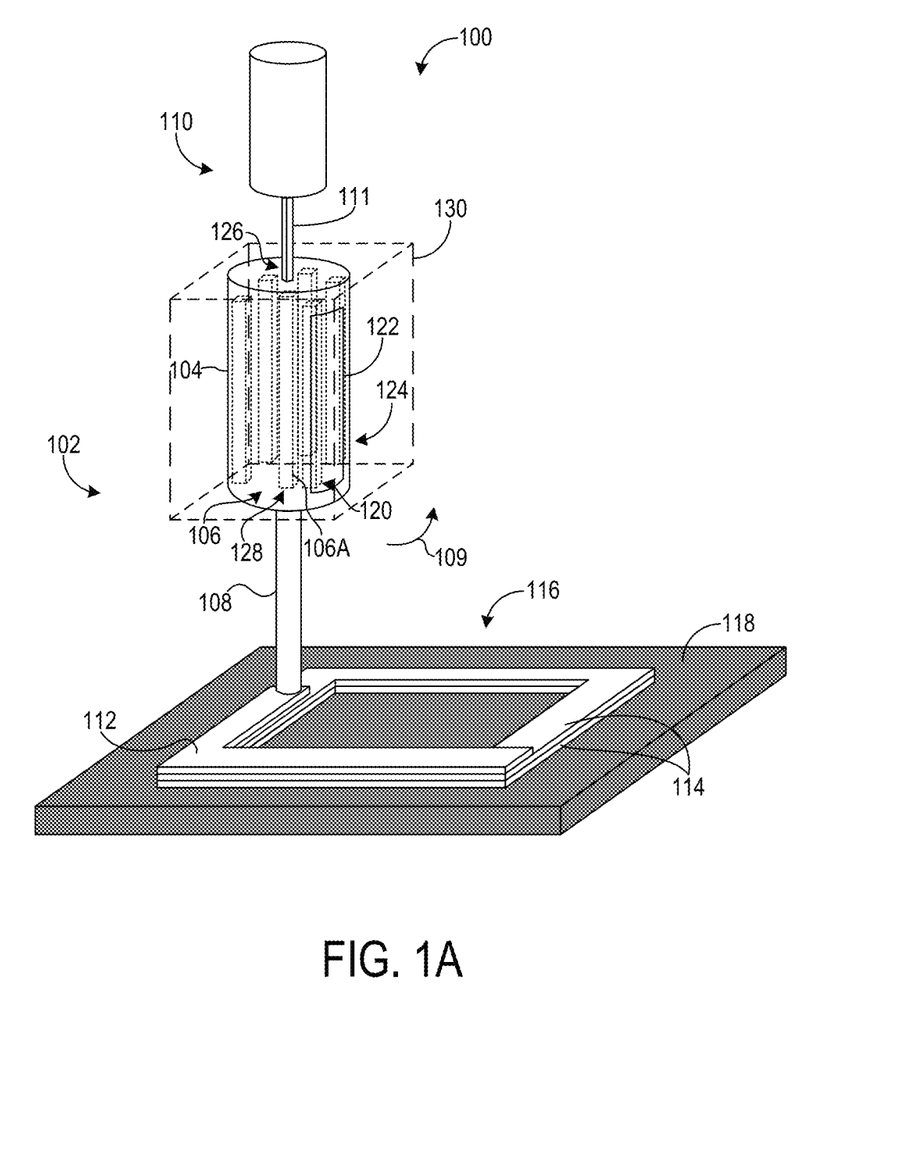
FIGS. 1A-1C show illustrations depicting an additive friction stir deposition (AFSD) system and portions of an AFSD machine according an example embodiment of the present disclosure.
Figure 1B:
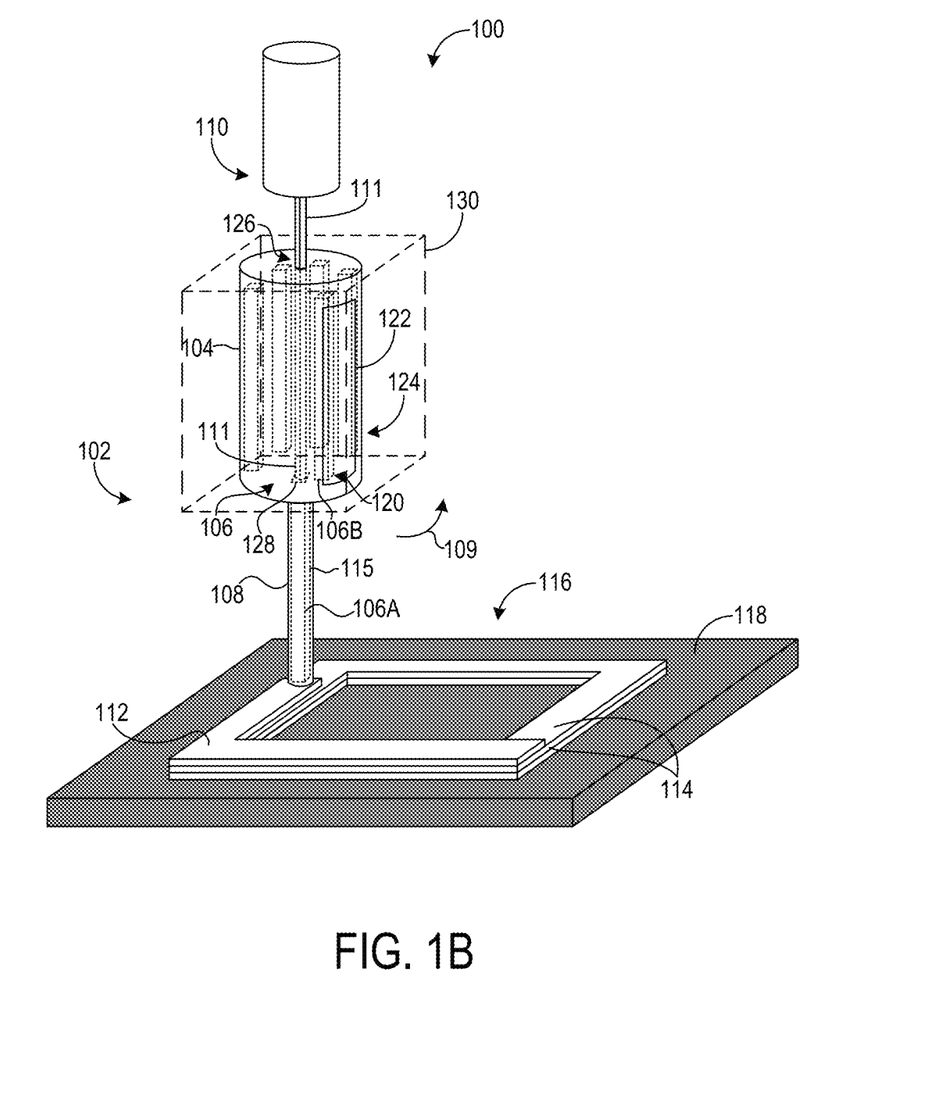
Figure 1C:
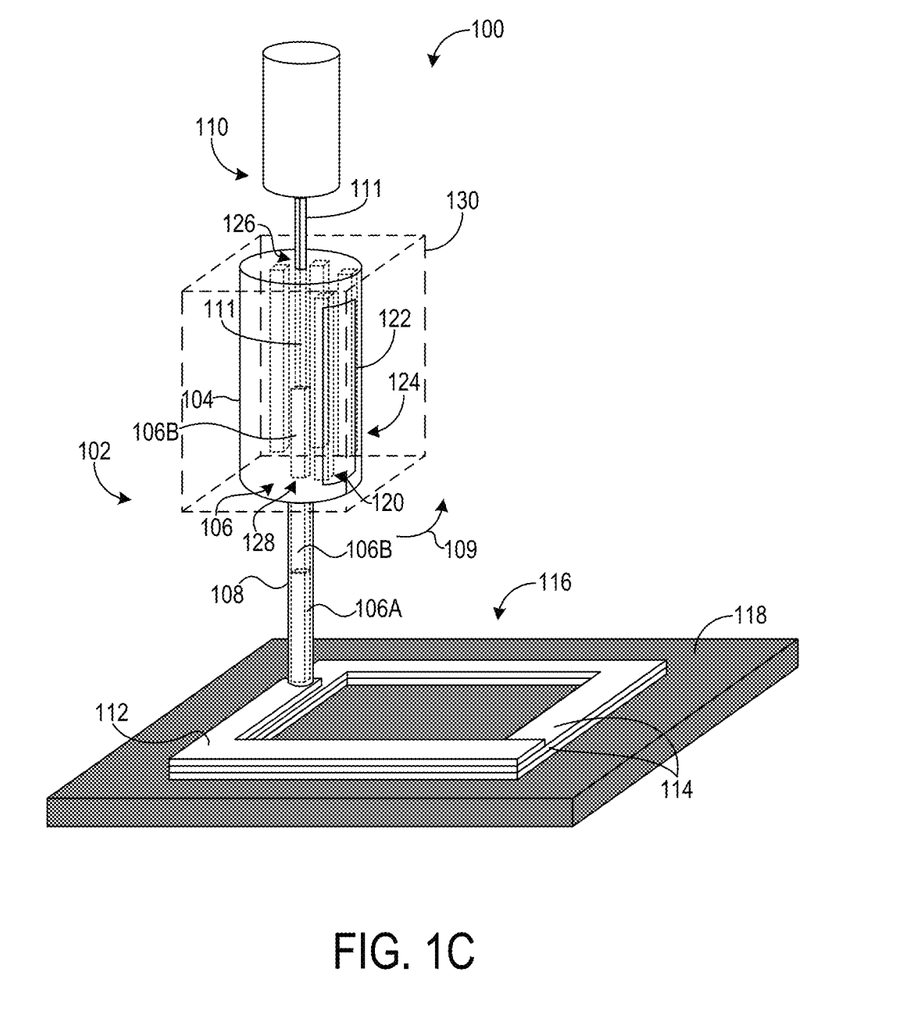

FIGS. 1A-1C illustrate an example AFSD system 100 including portions of an AFSD machine 102. AFSD system 100 includes a container 104 disposed adjacent to a spindle 108 of AFSD machine 102. The container 104 is configured to hold a plurality of feedstock bars 106. The feedstock bars 106 each have a cross section that is keyed to be received in a correspondingly-shaped aperture 115 extending through the spindle 108. In this manner and with reference to FIG. 1B, an individual feedstock bar 106A is fed downwardly through the rotating spindle 108 to produce frictional heating at the interface of the rotating feedstock bar 106A and a previously formed layer 114 (in the example of FIG. 1B) or a substrate 118. As the substrate 118 and rotating spindle 108 move relative to one another, such frictional heating and rotation of the feedstock bar 106A stirs and deforms feedstock bar 106A to create softened material that is deposited to form a new layer 112 on top of previously formed layers 114 of a part 116 formed on a substrate 118.

In the example of FIGS. 1A-1C, the feedstock bars 106 have a square cross section. In other example implementations, rectangular, triangular and other suitable cross sections for feedstock bars can be utilized. Additionally, spindle 108 and container 104 rotate synchronously, as indicated at 109, to enable continual loading of multiple feedstock bars 106 without stopping spindle rotation, as described in more detail below. In different implementations, container 104 is fixedly or removeable coupled to spindle 108 to facilitate such synchronous rotation. In some examples, loading actuator 110 also can rotate with the container 104 and spindle 108.

With reference to FIGS. 1A and 1B and as described in more detail below, to load a feedstock bar 106 into spindle 108, a particular feedstock bar 106A is placed into axial alignment with spindle 108 disposed adjacent to container 104. With feedstock bar 106A in axial alignment with spindle 108, a loading actuator 110 of AFSD machine 102 pushes feedstock bar 106A through lower aperture 128 of container 104 into the aperture 115 of the spindle 108, as shown in FIG. 1B. The loading actuator 110 may comprise an electric motor, hydraulic cylinder, pneumatic actuator or other component for moving a loading shaft 111 to contact feedstock bar 106A.

During deposition of the feedstock bar 106A, loading shaft 111 is retracted and a subsequent feedstock bar 106B is moved from a staging position 120 (not in axial alignment with spindle 108) into axial alignment with spindle 108. With reference now to FIG. 1C, the subsequent feedstock bar 106B is then fed into spindle 108 via loading actuator 110 to abut feedstock bar 106A. In some implementations, the movement of feedstock bar 106B from the staging position 120 into axial alignment with spindle 108 results from rotating the plurality of feedstock bars 106 within container 104 to advance feedstock bar 106B into such axial alignment. This process—the repeated rotation of feedstock bars 106, movement of an individual feedstock bar 106 from staging position 120 into axial alignment with spindle 108, and loading of the individual feedstock bar 106 into spindle 108—may be repeated such that each feedstock bar 106 held in container 104 is deposited into layer(s) on substrate 118. Accordingly, the plurality of feedstock bars 106 may be deposited in a substantially continuous manner and without stopping rotation of spindle 108, thereby enabling the advantages associated with such deposition described above.

Figure 2:
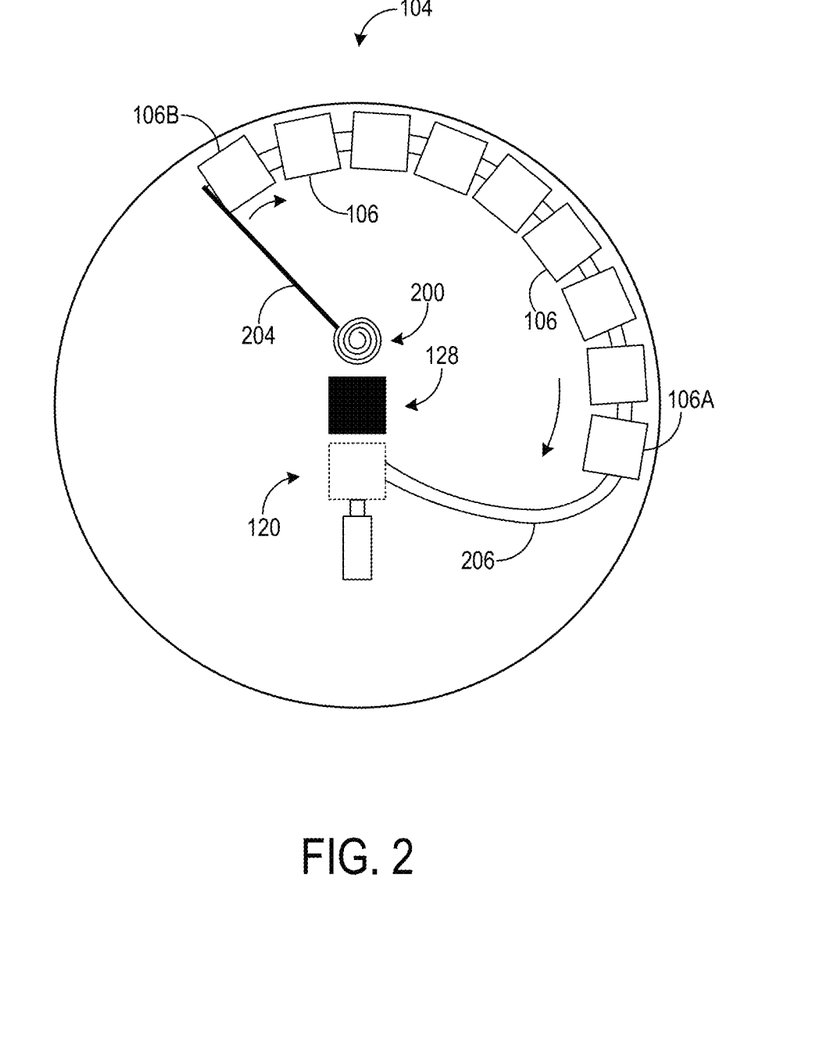
FIG. 2 shows a cross-sectional plan illustration that schematically depicts a container of the AFSD system of FIGS. 1A-1C according an example embodiment of the present disclosure.
Figure 3:
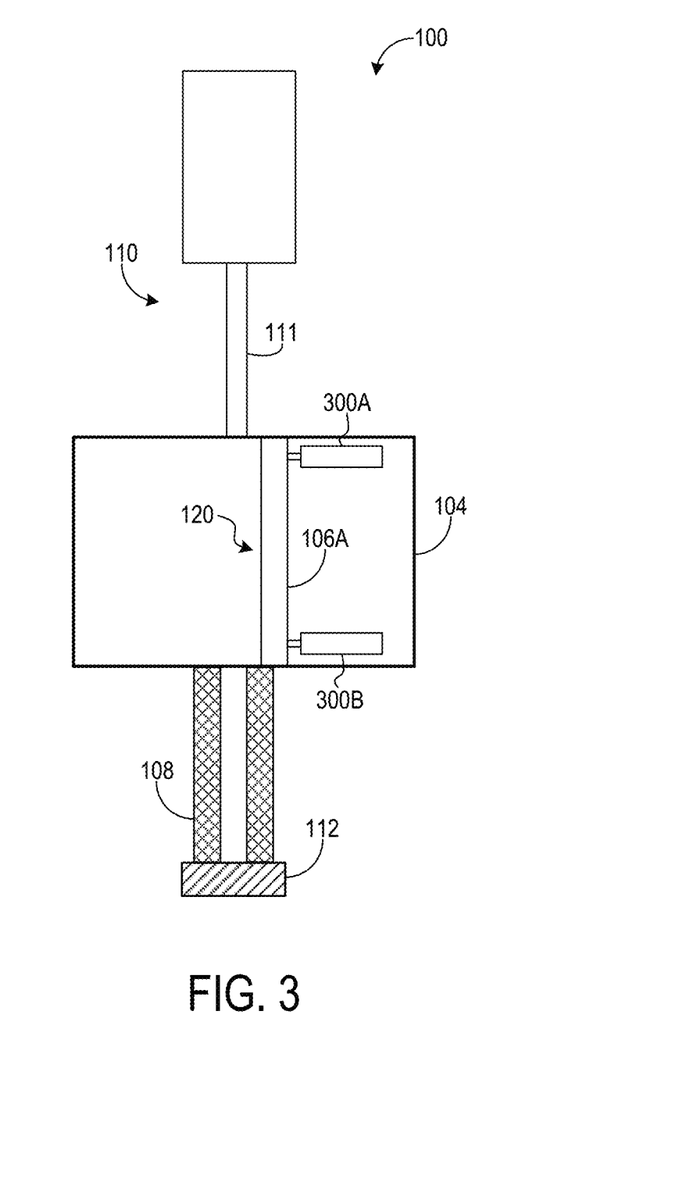
FIG. 3 shows a cross-sectional illustration of the AFSD system of FIGS. 1A-1C including staging actuators according an example embodiment of the present disclosure.
Figure 4:
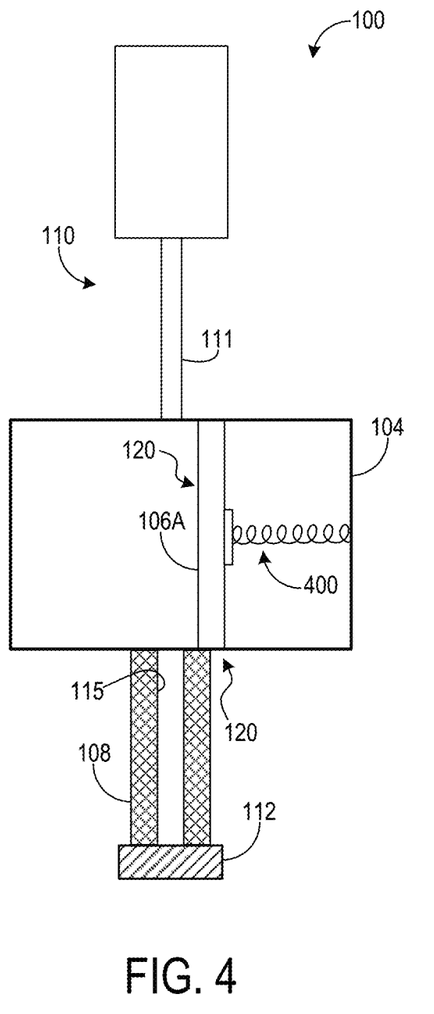
FIG. 4 shows a cross-sectional illustration of the AFSD system of FIGS. 1A-1C including a staging spring according an example embodiment of the present disclosure.
Figure 5:
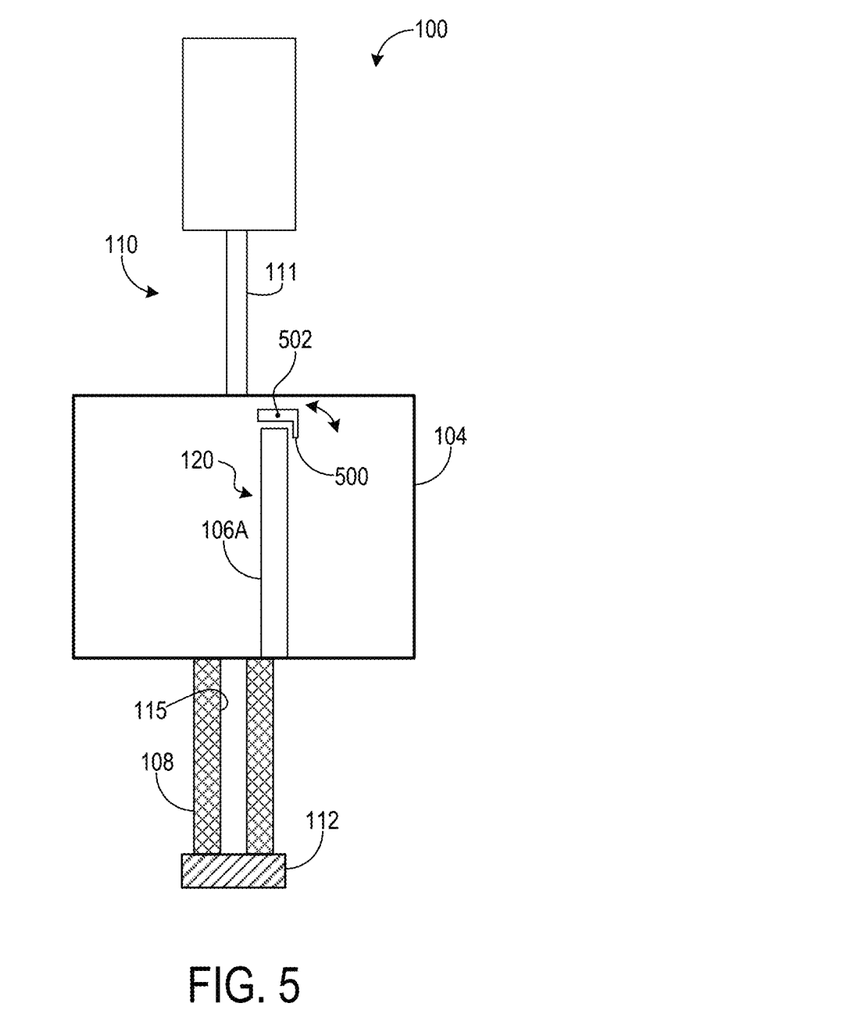
FIG. 5 shows a cross-sectional illustration of the AFSD system of FIGS. 1A-1C including a rotating lever according an example embodiment of the present disclosure.
Figure 6:
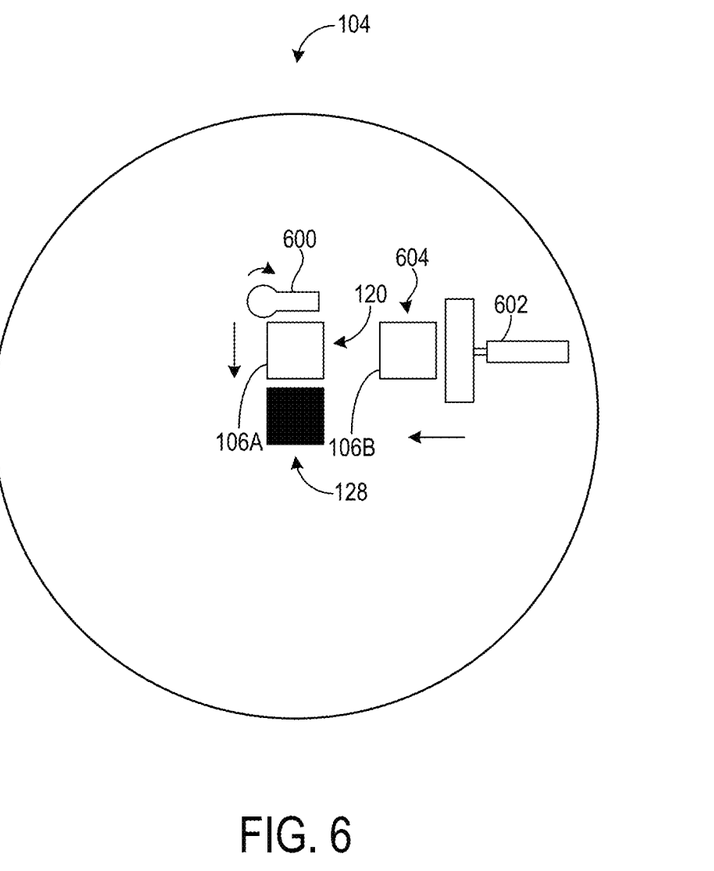
FIG. 6 shows a cross-sectional plan illustration of a container of the AFSD system of FIGS. 1A-1C including another rotating lever according an example embodiment of the present disclosure.
Figure 7:
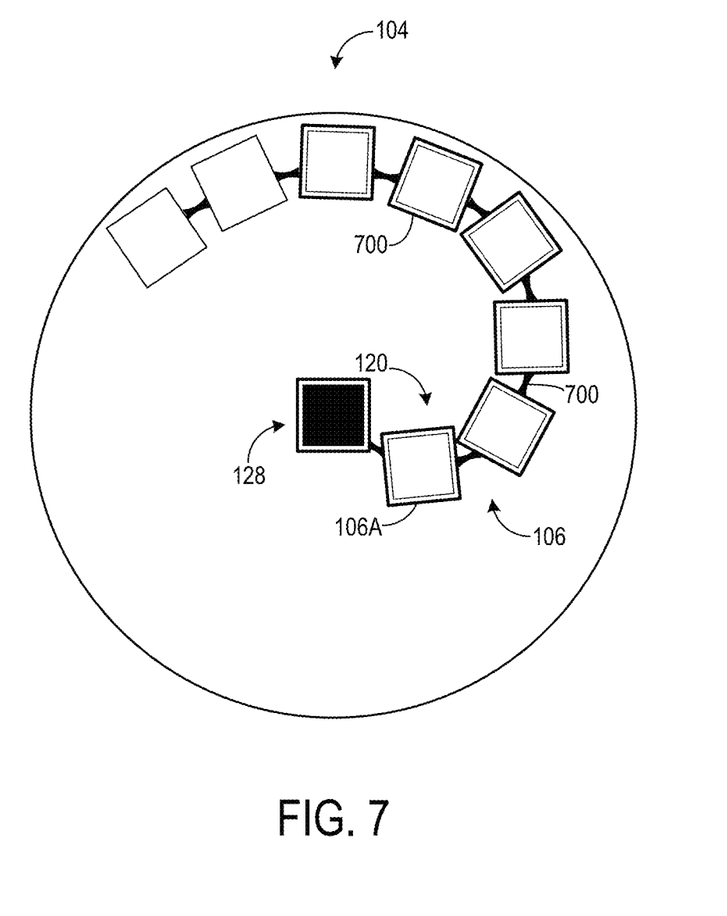
FIG. 7 shows a cross-sectional plan illustration of a container of the AFSD system of FIGS. 1A-1C including a chain according an example embodiment of the present disclosure.
Figure 8:
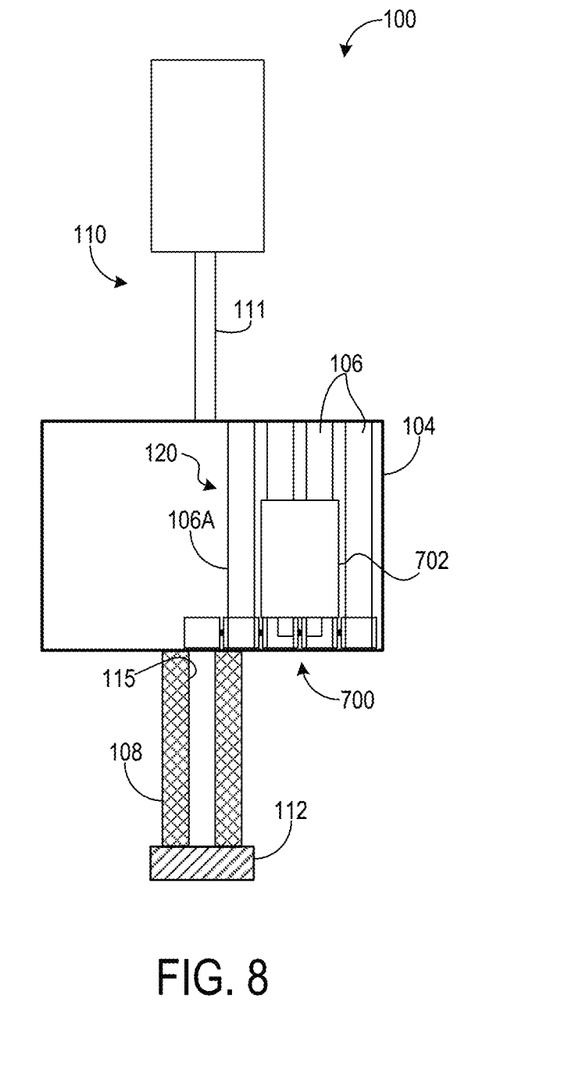
FIG. 8 shows a cross-sectional illustration of the AFSD system of FIGS. 1A-1C including the container and chain of FIG. 7 according an example embodiment of the present disclosure.
Figure 9:
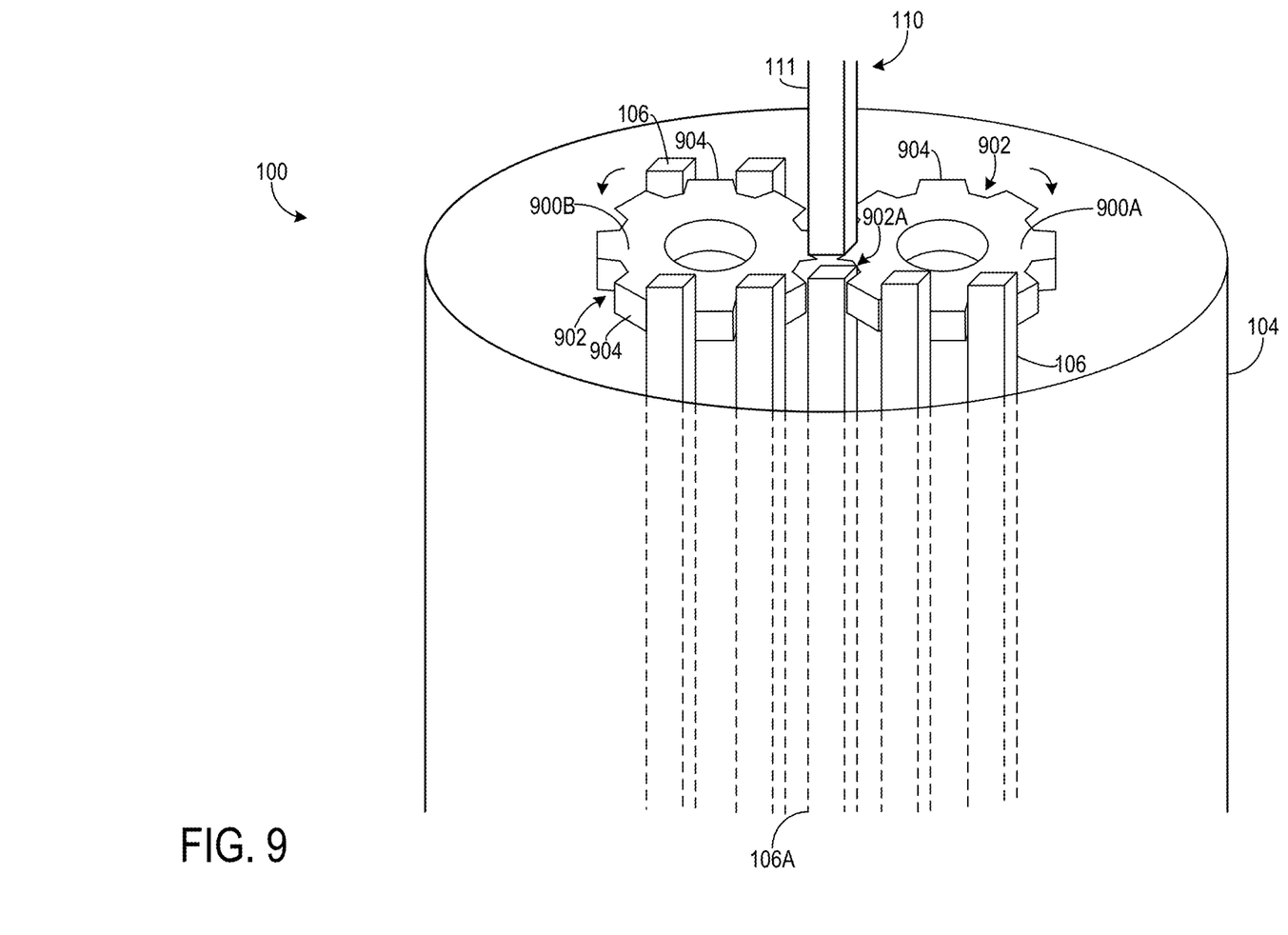
FIG. 9 shows an illustration of a container of the AFSD system of FIGS. 1A-1C including revolving gears.

AFSD machine 102 can employ various mechanisms to contain the plurality of feedstock bars 106 in container 104, position individual feedstock bars 106 in a staging position, and move individual feedstock bars 106 from a staging position into axial alignment with spindle 108. Examples of such mechanisms are described below; briefly, FIG. 2 illustrates a helicoid spring used to bias feedstock bars 106, FIG. 3 illustrates the use of actuators to align feedstock bars 106 with spindle 108, FIG. 4 illustrates the use of a staging spring to align feedstock bars 106 with spindle 108, FIGS. 5 and 6 illustrate the use of levers to align feedstock bars 106 with spindle 108, FIGS. 7 and 8 illustrate the use of a chain and motor to contain and align feedstock bars 106 with spindle 108, and FIG. 9 illustrates the use of a gear-based revolver to contain and align feedstock bars 106 with spindle 108.

In some examples, reloading container 104 with feedstock bars 106 includes maintaining container 104 in a fixed position (i.e., the position depicted in FIGS. 1A-1C) relative to spindle 108 and loading the container 104 with new feedstock bars 106 via a door 122 in the container 104. As shown in FIGS. 1A-1C, door 122 is arranged at a lateral surface 124 of container 104. In other examples, a loading door is provided at the top or bottom surfaces of container 104.

In other examples, feedstock bars 106 are loaded into container 104 through an upper aperture 126 exposed by removing loading shaft 111 from the container 104, and/or through lower aperture 128 exposed by decoupling spindle 108 from container 104. Here, a staging and/or loading mechanism (examples of which are described below) is retracted or biased after loading feedstock bars 106, such that the feedstock bars 106 are placed in preloaded arrangement with one feedstock bar 106 arranged at staging position 120.

In examples where the position of container 104 relative to spindle 108 and loading actuator 110 is maintained, alignment of container 104 with spindle 108 is also maintained. In other examples, container 104 is removable from AFSD machine 102 for purposes such as facilitating reloading of the container 104 with feedstock bars 106, performing maintenance on the container 104, or other purposes. In these examples, an alignment mechanism 130 may be employed to align container 104 with spindle 108 when container 104 is reinserted into AFSD machine 102. Alignment mechanism 130 may assume the form of a frame, brace, tool, or any other suitable form that aligns the container 104 with spindle 108. In some examples, additional containers 104 may be loaded with feedstock bars 106 and inserted into AFSD machine 102 to replace an empty container 104, and thereby further reduce downtime and increase deposition throughput.

Part 116 fabricated using AFSD machine 102 may be a preform, as one example. In other examples, AFSD machine 102 is used to form any suitable type of part, including but not limited to aircraft and vehicle parts. AFSD machine 102 also can be used to repair and/or coat existing parts, in addition to forming new parts. Further and as noted above, AFSD machine 102 may utilize feedstock bars 106 of any suitable type and size. As examples, feedstock bars 106 may be configured with a length between 1 and 2 feet.

As described above, container 104 may include a variety of different mechanisms to hold and position feedstock bars 106 therein. FIG. 2 illustrates a cross-sectional plan view of container 104 in an example where a helicoid spring 200 is used to position a plurality of feedstock bars 106. In this example, helicoid spring 200 is compressed and, upon release, applies a biasing force to feedstock bars 106 via a rod 204 contacting a rearmost feedstock bar 106B. This force is transmitted to the other feedstock bars 106 via a mechanism that couples feedstock bars 106 together, or through mutual direct contact between adjacent feedstock bars, such that a frontmost feedstock bar 106A is biased into staging position 120. Helicoid spring 200 thus functions to position feedstock bar 106A in a staging position 120 for subsequent axial alignment with lower aperture 128 and insertion into spindle 108. Example mechanisms for moving feedstock bar 106A into axial alignment with lower aperture 128 are described below with reference to FIGS. 3-6.

In one implementation container 104 includes a track 206 to guide the movement of feedstock bars 106 toward staging position 120 from the relatively more radially outward positions in which feedstock bars 106 are depicted in FIG. 2. While FIG. 2 depicts a particular length and geometry of track 206, it will be understood that these properties are variable—for example, track 206 may be configured with a relatively longer length that winds or spirals toward staging position 120, which enables a greater number of feedstock bars 106 to be held within container 104. Accordingly, the helicoid spring 200 is appropriately positioned in container 104 in view of the configuration of track 206, including positions above and below feedstock bars 106. In the example depicted in FIG. 2, helicoid spring 200 is arranged near lower aperture 128, and extends along at least a portion of the axial length of container 104. Further, helicoid spring 200 may be recompressed at any suitable time—for example while container 104 is reloaded with feedstock bars 106.

As described above, container 104 includes a staging mechanism to move a feedstock bar 106 from staging position 120 into axial alignment with lower aperture 128 and thus axial alignment with spindle 108 and its aperture 115. FIG. 3 illustrates a cross-sectional view of AFSD system 100 in an example where a first staging actuator 300A and a second staging actuator 300B are used to move feedstock bar 106A from staging position 120 into axial alignment with spindle 108. FIG. 3 particularly depicts a state in which feedstock bar 106A is arranged at staging position 120, with spindle 108 empty and loading shaft 111 fully retracted from container 104. In this state, staging actuators 300 contact and apply a lateral force to move feedstock bar 106A into axial alignment with spindle 108. Staging actuators 300 can take any suitable form, including but not limited to that of an electric motor, hydraulic cylinder, pneumatic actuator or other component.

As another example of a staging mechanism, FIG. 4 illustrates a cross-sectional view of AFSD system 100 in an example where a staging spring 400 is used to move feedstock bar 106A from staging position 120 into axial alignment with spindle 108. Staging spring 400 is compressed and subsequently released to thereby move feedstock bar 106A from staging position 120 into axial alignment with spindle 108. In some examples, spring 400 is compressed as container 104 is loaded with feedstock bars 106 (e.g., where such loading is performed after removing container 104 from AFSD machine 102). In other words, feedstock bars 106, when loaded into container 104, provide a compressive force to spring 400 to thereby place the spring 400 in a compressed state. In other examples, a lateral door on container 104, such as door 122, may be used to load feedstock bars 106 and thereby compress spring 400. In yet other examples, a detachable linear magazine loaded externally into container 104 can be used to load feedstock bars 106 and compress spring 400.

As another example of a staging mechanism, FIG. 5 illustrates a cross-sectional view of AFSD system 100 in an example where a rotating lever 500 is used to move feedstock bar 106A from staging position 120 into axial alignment with spindle 108. Rotating lever 500 is rotatable about a rotational axis 502, which may be substantially perpendicular to the longitudinal axis of feedstock bar 106A. In the depicted example, rotating lever 500 rotates in a clockwise direction to apply a force that moves feedstock bar 106A into axial alignment with spindle 108. Lever 500 then rotates in a counterclockwise direction until a subsequent feedstock bar 106 is placed into staging position 120. Any suitable actuator may be used to drive rotating lever 500, including but not limited to the example actuators discussed above.

Container 104 may employ other types of rotating mechanisms to move feedstock bar 106A from staging position 120 into axial alignment with spindle 108. As another example, FIG. 6 illustrates a cross-sectional plan view of container 104 in an example where a rotating lever 600 is used in combination with a staging actuator 602 to stage and align feedstock bar 106A. Rotating lever 600 rotates about an axis substantially parallel to the longitudinal axis of feedstock bar 106A, shown in staging position 120, to thereby move feedstock bar 106A into axial alignment with lower aperture 128 and spindle 108. In one example lever 600 is located approximately midway along the longitudinal axis of container 104. In other implementations, two or more levers 600 are positioned at spaced-apart locations along the longitudinal axis of container 104 to contact feedstock bar 106A at different locations along the bar.

With staging position 120 unoccupied by feedstock bar 106A, staging actuator 602 advances a subsequent feedstock bar 106B from an intermediate position 604 to staging position 120. Any suitable actuators may be used to drive rotating lever 600 and for staging actuator 602, including but not limited to the example actuators discussed above.

As another example of a mechanism by which feedstock bars 106 are held and staged, FIG. 7 illustrates a cross-sectional plan view of container 104 in an example where a plurality of feedstock bars 106 are connected to one another via a chain 700. An actuator 702 (see FIG. 8) is coupled to chain 700 and configured to drive chain 700 and, via the mutual connection of feedstock bars 106 to chain 700, move each feedstock bar 106. In operation, feedstock bar 106A is moved from staging position 120 into axial alignment with lower aperture 128 and spindle 108.

While FIG. 7 depicts a particular length and geometry of chain 700, it will be understood that these properties are variable—for example, chain 700 may be configured with a relatively longer length that winds or spirals toward staging position 120, which enables a greater number of feedstock bars 106 to be held within container 104. As examples, chain 700 may be routed in a circular or elliptical path.

FIG. 8 illustrates a cross-sectional view of AFSD system 100 with container 104 configured to use chain 700 to position feedstock bars 106. In the depicted state, feedstock bar 106A is arranged at staging position 120. Upon advancing feedstock bar 106A into axial alignment with spindle 108 via actuator 702, loading actuator 110 applies a force to load feedstock bar 106A into spindle 108 for deposition as described above. Actuator 702 can assume any suitable form, including but not limited to that of a stepper motor. In such examples, the stepper motor advances a feedstock bar 106 to a location previously occupied by another feedstock bar 106. For example, in operation the stepper motor advances feedstock bar 106A from staging location 120 into axial alignment with spindle 108.

While the location of chain 700 is depicted toward the bottom of container 104 in this example, in other examples chain 700 is arranged at other locations, such as at or near the middle (along the longitudinal axis) or at the top of container 104. Further, chain 700 may be configured in any suitable manner. In some examples, chain 700 is consumable, in which case chain 700 can be removed and replaced (e.g., upon reloading feedstock bars 106 into container 104).

As another example of a mechanism by which feedstock bars 106 are held and staged, FIG. 9 illustrates a partial view of container 104 configured with a staging mechanism having a first gear 900A and a second gear 900B. Each feedstock bar 106 is removably retained within a gap 902 formed between adjacent teeth of each gear. Feedstock bar 106A is removably retained within a gap 902A of gear 900A and advanced via revolving motion of gear 900A from a staging position into axial alignment with spindle 108. With feedstock bar 106A in axial alignment with spindle 108, loading actuator 110 and loading shaft 111 imparts force to feedstock bar 106A to thereby move feedstock bar 106A into spindle 108 for deposition, as described above.

In the depicted example, gears 900A and 900B individually counterrotate to advance feedstock bars 106, though any suitable type of geared motion may be used. In other examples, container 104 utilizes other numbers of gears 900, including a single gear 900. Any suitable actuator(s) may be used to actuate gears 900A and 900B, including but not limited to steppers motors respectively provided for each gear 900A and 900B.

Figure 10:
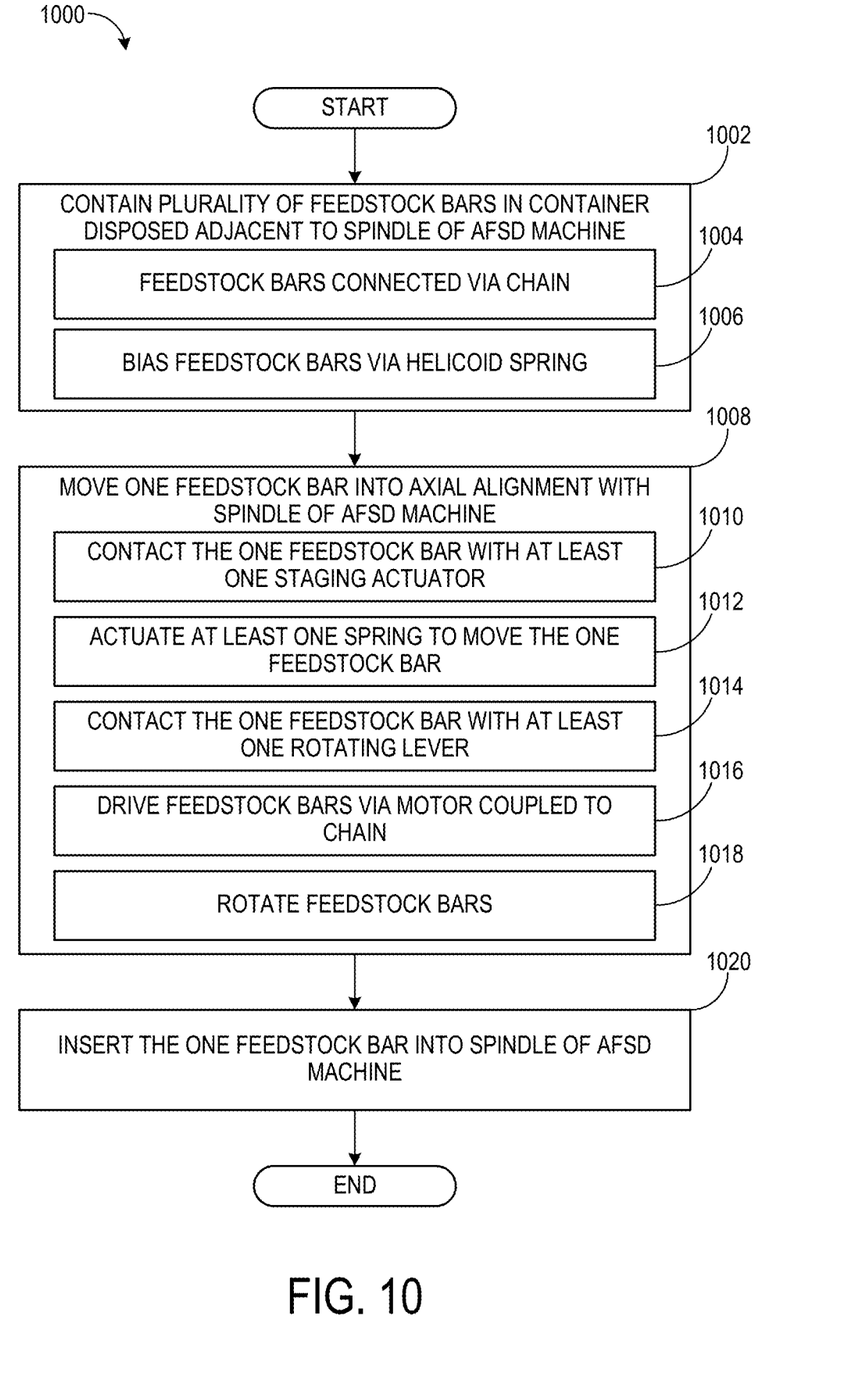
FIG. 10 shows a flowchart illustrating a method for loading feedstock bars into an AFSD machine.

FIG. 10 shows a flowchart illustrating a method 1000 for loading feedstock bars into an AFSD machine. Method 1000 may be performed to load feedstock bars 106 into AFSD machine 102, for example.

At 1002, method 1000 includes containing a plurality of feedstock bars (e.g., feedstock bars 106) in a container (e.g., container 104) disposed adjacent to a spindle (e.g., spindle 108) of the AFSD machine. In some examples the plurality of feedstock bars are connected 1004 to one another via a chain (e.g., chain 700). In some examples the container includes a helicoid spring (e.g., helicoid spring 200), and the plurality of feedstock bars are biased 1006 in the container via the helicoid spring.

At 1008, method 1000 includes moving one feedstock bar (e.g., feedstock bar 106A) of the plurality of feedstock bars into axial alignment with the spindle of the AFSD machine. In some examples moving the one feedstock bar into axial alignment with the spindle comprises contacting 1010 the one feedstock bar with at least one staging actuator (e.g., staging actuators 300). In some examples moving the one feedstock bar into axial alignment with the spindle comprises actuating 1012 at least one spring (e.g., staging spring 400) to move the one feedstock bar. In some examples moving the one feedstock bar into axial alignment with the spindle comprises contacting 1014 the one feedstock bar with at least one rotating lever (e.g., rotating lever 500, rotating lever 600). Where a chain connects the plurality of feedstock bars, in some examples moving the one feedstock bar into axial alignment with the spindle comprises driving 1016 the plurality of feedstock bars via a motor (e.g., actuator 702) coupled to the chain. In some examples moving the one feedstock bar into axial alignment with the spindle comprises rotating 1018 the plurality of feedstock bars. At 1020, method 1000 includes inserting the one feedstock bar into the spindle of the AFSD machine.

The apparatuses, systems, and methods described herein have the potential benefits of increasing the rate and throughput of deposition by an AFSD machine, reducing operator involvement, reducing feedstock waste, increasing part yield and economy, raising part quality, and increasing potential part geometries.

The present disclosure includes all novel and non-obvious combinations and subcombinations of the various features and techniques disclosed herein. The various features and techniques disclosed herein are not necessarily required of all examples of the present disclosure. Furthermore, the various features and techniques disclosed herein may define patentable subject matter apart from the disclosed examples and may find utility in other implementations not expressly disclosed herein.

The invention claimed is:

1. A method for loading feedstock bars into an additive friction stir deposition machine from a container positioned above and disposed adjacent to a spindle of the additive friction stir deposition machine, the method comprising:
    containing a plurality of feedstock bars in the container; and
    moving one feedstock bar of the plurality of feedstock bars into axial alignment with the spindle of the additive friction stir deposition machine using a staging mechanism configured to contact and apply a lateral force to move the one feedstock bar from a staging position, in which a longitudinal axis of the feedstock bar is parallel to a longitudinal axis of the spindle of the additive friction stir deposition machine and is not in axial alignment with the spindle, to another position in which the longitudinal axis of the feedstock bar is in axial alignment with the spindle of the additive friction stir deposition machine and is parallel to the longitudinal axis of the spindle.

2. The method of claim 1, further comprising inserting the one feedstock bar into the spindle of the additive friction stir deposition machine.

3. The method of claim 1, wherein moving the one feedstock bar into axial alignment with the spindle comprises contacting the one feedstock bar with at least one staging actuator.

4. The method of claim 1, wherein moving the one feedstock bar into axial alignment with the spindle comprises actuating at least one spring to move the one feedstock bar.

5. The method of claim 1, wherein moving the one feedstock bar into axial alignment with the spindle comprises contacting the one feedstock bar with at least one rotating lever.

6. The method of claim 1, wherein the plurality of feedstock bars in the container are connected to one another via a chain.

7. The method of claim 6, wherein moving the one feedstock bar into axial alignment with the spindle comprises driving the plurality of feedstock bars via a motor coupled to the chain.

8. The method of claim 1, wherein the container comprises a helicoid spring, the method further comprising biasing the plurality of feedstock bars in the container via the helicoid spring.

9. The method of claim 1, wherein moving the one feedstock bar into axial alignment with the spindle comprises rotating the plurality of feedstock bars.

10. A container for loading feedstock bars into an additive friction stir deposition machine, wherein the container is positioned above and adjacent to a spindle of the additive friction stir deposition machine and is configured to hold a plurality of feedstock bars, the container comprising:
a staging mechanism within the container, the staging mechanism configured to contact and apply a lateral force to move one feedstock bar of the plurality of feedstock bars held within the container from a staging position, in which a longitudinal axis of the feedstock bar is parallel to a longitudinal axis of the spindle of the additive friction stir deposition machine and is not in axial alignment with the spindle, to another position in which the longitudinal axis of the feedstock bar is in axial alignment with the spindle of the additive friction stir deposition machine and is parallel to the longitudinal axis of the spindle.

11. The container of claim 10, wherein the staging mechanism comprises at least one staging actuator.

12. The container of claim 11, wherein the one feedstock bar is biased into the staging position by a helicoid spring, and the at least one staging actuator is configured to move the one feedstock bar into axial alignment with the spindle from the staging position in the container.

13. The container of claim 10, wherein the plurality of feedstock bars are connected to one another by a chain, and wherein the staging mechanism is configured to drive the chain and move the one feedstock bar into axial alignment with the spindle.

14. The container of claim 10, wherein the staging mechanism comprises a motor.

15. The container of claim 10, wherein the staging mechanism comprises a rotating lever.

16. The container of claim 10, wherein the staging mechanism comprises at least one spring.

17. The container of claim 10, wherein the staging mechanism comprises at least one gear that removably retains the plurality of feedstock bars and moves the one feedstock bar into axial alignment with the spindle.

18. A system for loading feedstock bars into an additive friction stir deposition machine, the system comprising:
a container positioned above and adjacent to a spindle of the additive friction stir deposition machine and configured to hold a plurality of feedstock bars;
a staging mechanism within the container, the staging mechanism configured to contact and apply a lateral force to move one feedstock bar of the plurality of feedstock bars held within the container from a staging position, in which a longitudinal axis of the feedstock bar is parallel to a longitudinal axis of the spindle of the additive friction stir deposition machine and is not in axial alignment with the spindle, to another position in which the longitudinal axis of the feedstock bar is in axial alignment with the spindle of the additive friction stir deposition machine and is parallel to the longitudinal axis of the spindle; and
a loading actuator configured to insert the one feedstock bar into the spindle of the additive friction stir deposition machine.

19. The system of claim 18, wherein the staging mechanism comprises one of a staging actuator, a staging spring, a rotating lever, and a gear.

20. The system of claim 18, wherein the staging mechanism comprises a pair of staging actuators that contact and move the one feedstock bar into alignment with the spindle.

* * * * *